US011295416B2

(12) United States Patent
Tan (10) Patent No.: US 11,295,416 B2
(45) Date of Patent: Apr. 5, 2022

(54) METHOD FOR PICTURE PROCESSING, COMPUTER-READABLE STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Guohui Tan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 270 days.

(21) Appl. No.: 16/693,961

(22) Filed: Nov. 25, 2019

(65) Prior Publication Data

US 2020/0090310 A1    Mar. 19, 2020

Related U.S. Application Data

(63) Continuation of application No. PCT/CN2018/089115, filed on May 31, 2018.

(30) Foreign Application Priority Data

May 31, 2017   (CN) .......................... 201710400970.4

(51) Int. Cl.
*H04N 5/217*   (2011.01)
*G06T 5/00*    (2006.01)
*G06T 5/50*    (2006.01)

(52) U.S. Cl.
CPC ................ *G06T 5/002* (2013.01); *G06T 5/50* (2013.01); *G06T 2207/10004* (2013.01); *G06T 2207/20182* (2013.01); *G06T 2207/30201* (2013.01)

(58) Field of Classification Search
CPC . G06T 5/002; G06T 5/50; G06T 2207/10004; G06T 2207/20182; G06T 2207/30201
(Continued)

(56) References Cited

U.S. PATENT DOCUMENTS 8,315,474 B2    11/2012   Okada et al.
2009/0060383 A1  3/2009   Li et al.
(Continued)

FOREIGN PATENT DOCUMENTS

CN    106127698      11/2016
CN    106250426      12/2016
CN    107180417 A     9/2017

OTHER PUBLICATIONS

Wheeler et al., "Multi-Frame Image Restoration for Face Recognition," IEEE Workshop on Signal Processing Applications for Public Security and Forensics, Apr. 2007, 6 pages.
(Continued)

Primary Examiner — Stephen P Coleman
(74) Attorney, Agent, or Firm — Hodgson Russ LLP (57) ABSTRACT

A method for picture processing is provided. The method includes the following. Multiple pictures are obtained through photographing. At least two pictures are selected from the multiple pictures, and according to facial information of each of the at least two pictures, feature information of a preset facial part in each of the at least two pictures is obtained. One or more target pictures are determined in response to the feature information of the preset facial part in one of the at least two pictures indicating that the preset facial part is in a preset feature state, where the one of the at least two pictures is determined as one target picture. When multiple target pictures are obtained, a multi-frame denoising processing is performed on the target pictures to obtain an output picture.

11 Claims, 6 Drawing Sheets

(58) Field of Classification Search
USPC .......................................................... 348/241
See application file for complete search history.

(56) References Cited

U.S. PATENT DOCUMENTS

2009/0185760 A1* 7/2009 Okada ................... G06T 3/4069
382/299
2015/0317512 A1* 11/2015 Shankaranarayana ......................
G06K 9/6807
382/118

OTHER PUBLICATIONS

EPO, Office Action for EP Application No. 18810707.2, Feb. 27, 2020.
WIPO, ISR for PCT/CN2018/089115, Aug. 8, 2018.
IPIN, First Office Action for IN Application No. 201917048852, dated Apr. 5, 2021.
EPO, Office Action for EP Application No. 18810707.2, dated Nov. 25, 2020.
SIPO, First Office Action for CN Application No. 201710400970.4, dated Apr. 10, 2019.
SIPO, Second Office Action for CN Application No. 201710400970, dated Aug. 6, 2019.

* cited by examiner

METHOD FOR PICTURE PROCESSING, COMPUTER-READABLE STORAGE MEDIUM, AND ELECTRONIC DEVICE

CROSS-REFERENCE TO RELATED APPLICATIONS

This application is a continuation application of International Application No. PCT/CN2018/089115, filed on May 31, 2018, which claims priority to Chinese Patent Application Serial No. 201710400970.4, filed on May 31, 2017. The entire disclosures of the aforementioned applications are incorporated herein by reference.

TECHNICAL FIELD

This disclosure relates to the technical field of picture processing, and particularly to a method for picture processing, a computer-readable storage medium, and an electronic device.

BACKGROUND

With the increasing development of camera performance and processor's computing capabilities, terminals can take pictures having a high sharpness with various image processing algorithms. For example, the terminal can take a number of pictures in a high speed, and a picture having low noise can be obtained via multi-frame denoising processing.

SUMMARY

Implementations of the present disclosure provide a method for picture processing, a computer-readable storage medium, and an electronic device.

The implementations of the present disclosure provide a method for picture processing. The method includes the following. Multiple pictures are obtained through photographing, where each of the multiple pictures contains facial information. At least two pictures are selected from the multiple pictures, and according to the facial information of each of the at least two pictures, feature information of a preset facial part in each of the at least two pictures is obtained. At least one target picture is determined in response to the feature information of the preset facial part in one of the at least two pictures indicating that the preset facial part is in a preset feature state, where the one of the at least two pictures is determined as one of the at least one target picture. Based on that the at least one target picture is embodied as multiple target pictures, a multi-frame denoising processing is performed on the target pictures to obtain an output picture.

The implementations of the present disclosure provides a computer-readable storage medium. The storage medium stores computer programs. The computer programs are loaded and executed by a processor to implement the operations of the method for picture processing provided in the implementations of the present disclosure.

The implementations of the present disclosure provide an electronic device. The electronic device includes a memory, a processor, and computer programs stored in the memory and capable of being run in the processor. The processor is configured to execute the computer programs to implement the following. Multiple pictures are obtained through photographing, where each of the multiple pictures contains facial information. At least two pictures are selected from the multiple pictures, and according to the facial information of each of the at least two pictures, feature information of a preset facial part in each of the at least two pictures is obtained. The at least two pictures are determined as target pictures in response to the feature information of the preset facial part in each of the at least two pictures indicating that the preset facial part is in a preset feature state. A multi-frame denoising processing is performed on the target pictures to obtain an output picture.

BRIEF DESCRIPTION OF THE DRAWINGS

The following will describe implementations of the present disclosure in detail in combination with the accompanying drawings, enabling technical solutions and beneficial effects of the present disclosure be apparent.

DETAILED DESCRIPTION

Referring to the accompanying drawings, same component symbols represent same components. The principle of the present disclosure is illustrated by implementing in a proper computation environment for example. The following illustration is based on illustrated implementations of the present disclosure, and shall not be deemed as a limitation on other implementations of the present disclosure that are not illustrated in detail herein.

Implementations of the present disclosure provide a method for picture processing. The method includes the following. Multiple pictures are obtained through photographing, where each of the multiple pictures contains facial information. At least two pictures are selected from the multiple pictures, and according to the facial information of each of the at least two pictures, feature information of a preset facial part in each of the at least two pictures is obtained. At least one target picture is determined in response to the feature information of the preset facial part in one of the at least two pictures indicating that the preset facial part is in a preset feature state, the one of the at least two pictures is determined as one of the at least one target picture. Based on that the at least one target picture is embodied as multiple target pictures, a multi-frame denoising processing is performed on the target pictures to obtain an output picture.

In an example, the preset facial part in each of the at least two pictures is an eye part in each of the at least two pictures, and the preset feature state is an eyes-open state.

In an example, the at least one target picture is determined as follows. In chronological order of taking the at least two pictures, whether the feature information of the preset facial part in each of the at least two pictures indicates that the preset facial part in each of the at least two pictures is in the preset feature state is detected. One of the at least two pictures is determined as one of the at least one target picture based on that the preset facial part in the one of the at least two pictures is in the preset feature state.

In an example, the method further includes the following. Based on that the at least one target picture is embodied as one target picture, the one target picture is determined as the output picture.

In an example, the method further includes the following. Searching for another target picture is stopped based on that the number of the target pictures determined reaches a preset number.

In an example, the method may further includes the following. A light sensitivity value used for photographing is obtained. A target number corresponding to the light sensitivity value is determined, where the target number is larger than or equal to two. The target number is determined as the preset number.

In an example, the method further includes the following. A correspondence table is set, where the correspondence table contains multiple light sensitivity value ranges and numbers each corresponding to one of the multiple light sensitivity value ranges, and where the larger light sensitivity values in one of the light sensitivity value ranges, the larger a number corresponding to the one of the light sensitivity value range.

The target number corresponding to the light sensitivity value is determined as follows. The correspondence table is queried and a light sensitivity value range containing the light sensitivity value is determined according to the correspondence table. A number corresponding to the light sensitivity value range containing the light sensitivity value is determined as the target number.

The following will illustrate the present disclosure in detail.

Figure 1:
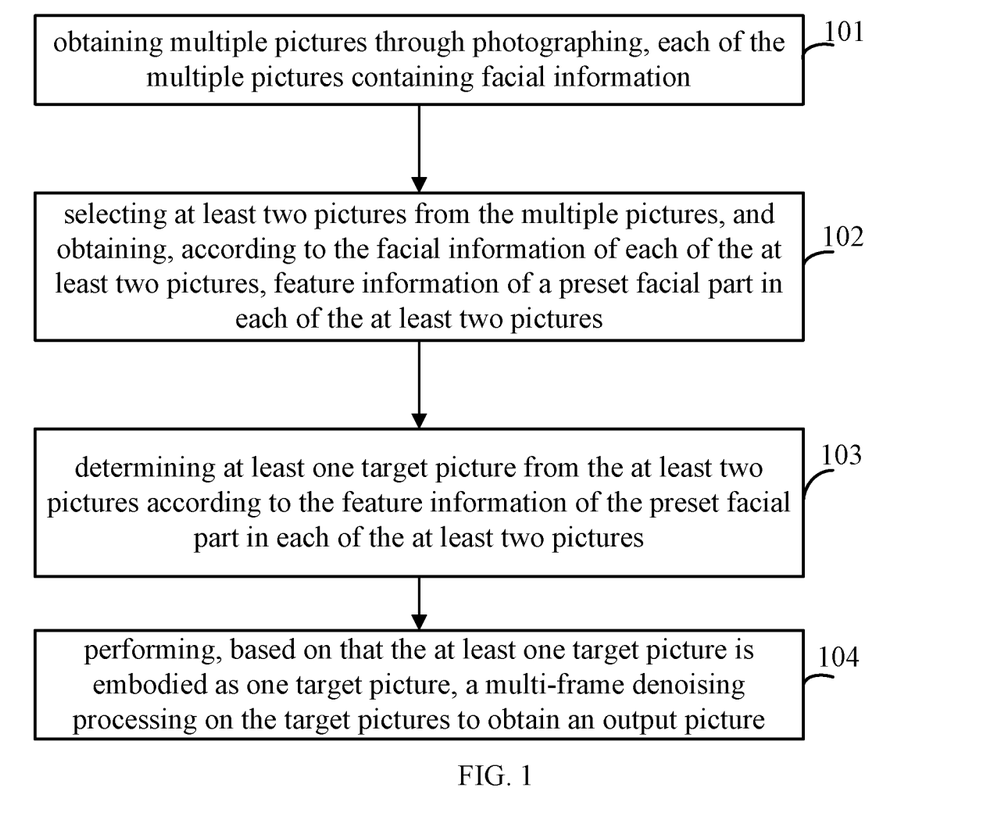
FIG. 1 is a schematic flow chart illustrating a method for picture processing according to an implementation of the present disclosure.

FIG. 1 is a schematic flow chart illustrating a method for picture processing according to an implementation of the present disclosure. The method includes the following.

At block 101, multiple pictures are obtained through photographing, where each of the multiple pictures contains facial information.

It can be understood that an execution subject in the implementation of the present disclosure may be a terminal device such as a smart phone, a tablet computer, or the like.

In the related art, when a multi-frame denoising function is activated, the terminal can input four pictures, and perform multi-frame synthesis on the four pictures to obtain a picture having low noise. However, if facial features of the four pictures acted as input are inconsistent, a facial part in a picture obtained via the multi-frame synthesis is blur, that is, noise of the facial part in the picture is relatively high.

In the implementation of the present disclosure, the terminal can first obtain the multiple pictures through photographing, where each of the multiple pictures contains the facial information.

For example, in low light, the terminal activates the multi-frame denoising function. When taking photos, for the same scene, the terminal may take multiple pictures continuously. For example, when taking a selfie or a picture of a user's friend, the terminal may quickly and continuously take eight or ten pictures. It can be understood that the eight or ten pictures taken by the terminal each contain facial information and have the same scene information.

At block 102, at least two pictures are selected from the multiple pictures, and according to facial information contained in each of the at least two pictures, feature information of a preset facial part in each of the at least two pictures is obtained.

At block 103, at least one target picture is determined in response to the feature information of the preset facial part in one of the at least two pictures indicating that the preset facial part is in a preset feature state, where the one of the at least two pictures is determined as one of the at least one target picture.

For example, the operations at blocks 102 and 103 can include the following. When the eight pictures each containing facial information are obtained, the terminal can select at least two pictures from the eight pictures. For example, the terminal can select six pictures from the eight pictures. For example, the six pictures are respectively pictures A, B, C, D, E, and F.

The terminal can then obtain, according to facial information of each of the pictures A, B, C, D, E, and F, feature information of a preset facial part in each of the pictures A, B, C, D, E, and F. For example, according to the facial information of the picture A, the terminal can obtain the feature information of the preset facial part in the picture A.

What needs to be illustrated is that in an example, the preset facial part may be easily changed between different states, for example, may be an eye part or a mouth part. For example, during photographing, a person to be photographed may blink, such that eye parts in some pictures are in an eyes-closed state, while eye parts in other pictures are in an eyes-open state.

Thereafter, the terminal can detect, according to the obtained feature information of the preset facial part in each of the pictures, whether the feature information of the preset facial part in each of the pictures indicates that the preset facial part in each of the pictures is in the preset feature state.

If the feature information of the preset facial part in one picture indicates that the preset facial part in the one picture is not in the preset feature state, the terminal can determine that the one picture is not a target picture. For example, when the terminal detects that the feature information of the preset facial part in the picture C indicates that the preset facial part in the picture C is not in the preset feature state, the terminal can determine that the picture C is not a target picture. That is, the terminal does not use the picture C as an input picture for multi-frame denoising processing.

If the feature information of the preset facial part in one picture indicates that the preset facial part in the one picture is in the preset feature state, the terminal can determine the one picture as a target picture. For example, when the terminal detects that the feature information of the preset facial part in the picture A indicates that the preset facial part in the picture A is in the preset feature state, the terminal can determine the picture A as a target picture. That is, the terminal uses the picture A as an input picture for multi-frame denoising processing.

At block 104, based on that the at least one target picture is embodied as multiple target pictures, the multi-frame denoising processing is performed on the target pictures to obtain an output picture.

For example, among the pictures A, B, C, D, E, and F, the pictures A, B, D, and E are determined as target pictures. The terminal can perform the multi-frame denoising processing on the pictures A, B, D, and E, and obtain a picture via multi-frame synthesis, that is, an output picture.

It can be understood that in the implementation of the present disclosure, for the target pictures used for the multi-frame denoising processing, the preset facial parts are all in the preset feature state, that is, the features of the preset facial parts are consistent. Compared with that the features of the preset facial parts are not consistent, in the implementation of the present disclosure, noise of the preset facial part in the output picture obtained via performing the multi-frame denoising processing on the target pictures is relatively low.

Figure 2:
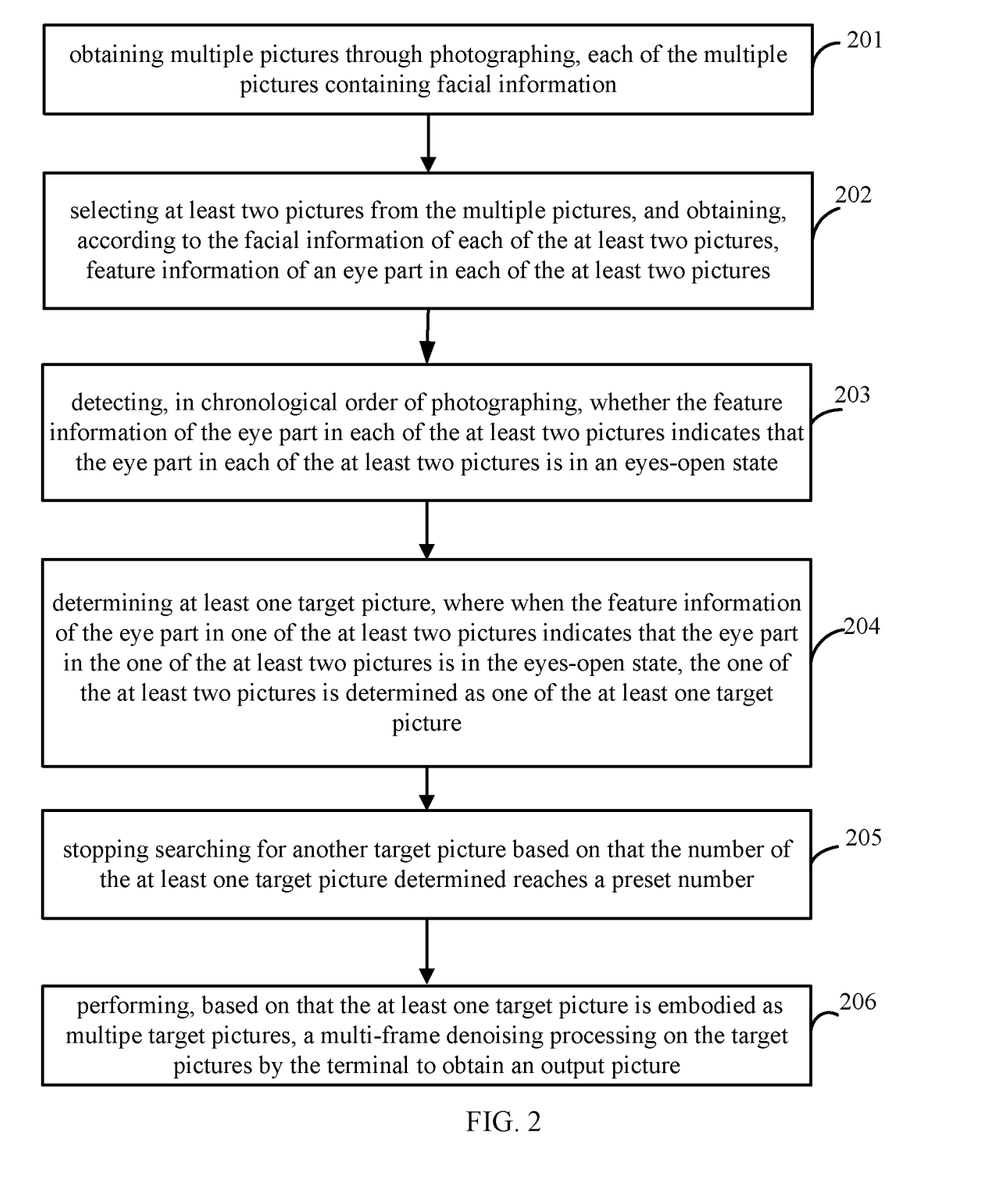
FIG. 2 is a schematic flow chart illustrating a method for picturing processing according to another implementation of the present disclosure.

FIG. 2 is a schematic flow chart illustrating a method for picture processing according to an implementation of the present disclosure. The method includes the following.

At block 201, a terminal obtains multiple pictures through photographing, where each of the multiple pictures contains facial information.

For example, under a condition that a multi-frame denoising function of the terminal is activated, when the terminal takes a half-length picture of a user's friend, the terminal may quickly and continuously take multiple pictures, for example, eight pictures.

Thereafter, the terminal can obtain the eight pictures taken, where the eight pictures each contain facial information of the user's friend.

At block 202, the terminal selects at least two pictures from the multiple pictures, and obtains, according to facial information of each of the at least two pictures, feature information of an eye part in each of the at least two pictures.

For example, after the eight pictures are obtained, the terminal can select at least two pictures from the eight pictures. In the implementation of the present disclosure, the terminal can select all the eight pictures.

Thereafter, the terminal can obtain, according to the facial information of each of the eight pictures, the feature information of the eye part in each of the eight pictures. For example, the eight pictures are respectively the pictures A, B, C, D, E, F, G, and H. The terminal can obtain, according to the facial information of the picture A, the feature information of the eye part in the picture A. The terminal can obtain, according to the facial information of the picture B, the feature information of the eye part in the picture B, and so on.

At block 203, the terminal detects, in chronological order of taking the at least two pictures, whether the feature information of the eye part in each of the at least two pictures indicates that the eye part in each of the at least two pictures is in an eyes-open state.

At block 204, the terminal determines at least one target picture in response to the feature information of the eye part in one of the at least two pictures indicating that the eye part is in the eyes-open state, where the terminal determines the one of the at least two pictures as one of the at least one target picture.

For example, the operations at blocks 203 and 204 may include the following. After obtaining the feature information of the eye part in each of the at least two pictures, in chronological order of taking the at least two pictures, the terminal can detect whether the feature information of the eye part in each of the at least two pictures indicates that the eye part in each of the at least two parts is in the eyes-open state, that is, the eyes are not closed.

For example, in chronological order of taking the pictures A, B, C, D, E, F, G, and H, the terminal can first detect whether the feature information of the eye part in the picture A indicates that the eye part in the picture A is in the eyes-open state.

If the feature information of the eye part in the picture A indicates that the eye part in the picture A is in the eyes-open state, the terminal can determine the picture A as a target picture.

If the feature information of the eye part in the picture A indicates that the eye part in the picture A is not in the eyes-open state, the terminal can determine that the picture A is not a target picture. That is, the terminal does not use the picture A as an input picture for a multi-frame denoising processing.

The terminal then detects whether the feature information of the eye part in the picture B indicates that the eye part in the picture B is in the eyes-open state. If the feature information of the eye part in the picture B indicates that the eye part in the picture B is in the eyes-open state, the terminal can determine the picture B as a target picture. If the feature information of the eye part in the picture B indicates that the eye part in the picture B is not in the eyes-open state, the terminal can determine that the picture B is not a target picture.

Similarly, the terminal can detect the pictures C, D, E, F, G, and H in sequence.

It can be understood that, generally, within a period from beginning of photographing, user's posture can be maintained, and thus needed target pictures can be obtained quickly by detecting, in chronological order of photographing, whether the feature information of the eye part in each picture indicates that the eye part in each picture is in the eyes-open state.

At block 205, when the number of the target pictures determined reaches a preset number, the terminal stops searching for a target picture.

For example, in the implementation of the present disclosure, during a process of sequentially detecting whether the eye parts in the pictures are in the eyes-open state, the terminal can further detect whether the number of the target pictures determined reaches the preset number.

When the number of the target pictures determined by the terminal reaches the preset number, the terminal can stop searching for a target picture.

When the number of the target pictures determined by the terminal does not reach the preset number, the terminal can further search for a target picture.

For example, the preset number is four. That is, during the process of sequentially detecting whether the eye parts in the pictures A, B, C, D, E, F, G, and H are in the eyes-open state, if the terminal detects that the number of the target pictures determined by the terminal reaches four, the terminal can stop searching for a target picture.

For example, the terminal determines the pictures A and B as target pictures, determines that the pictures C and D are not target pictures, and determines the pictures E and F as target pictures. When the picture F is determined as a target picture, the terminal can detect that the number of the target pictures determined by the terminal reaches four, and then the terminal can stop searching for a target picture. That is, the terminal can stop detecting whether the eye parts in the pictures G and H are in the eyes-open state.

If the terminal detects that the number of the target pictures determined by the terminal does not reach four, the terminal can further search for a target picture until that the picture H is detected.

At block 206, the terminal performs the multi-frame denoising processing on the target pictures to obtain an output picture.

For example, after obtaining the target pictures amount to the preset number, the terminal can perform the multi-frame denoising processing on the target pictures to obtain the output picture.

For example, the terminal can perform the multi-frame denoising processing on the target pictures A, B, E, and F to obtain an output picture I.

It can be understood that in the implementation of the present disclosure, since the terminal determines that the eye parts in the target pictures A, B, E and F are all in the eyes-open state, the features of the eye parts in the target pictures A, B, E, and F are consistent. Compared with that the facial features are not consistent (for example, the multi-frame denoising processing are performed on the pictures A, B, C, and D, where the eye parts in the pictures A and B are in the eyes-open state, and the eye parts in the pictures C and D are not in the eyes-open state), in the implementation of the present disclosure, noise of the facial part in the output picture obtained by performing the multi-frame denoising processing on the target pictures A, B, E, and F is relatively low, and thus the output picture is of high sharpness.

In one example, the preset number at block 205 can be determined as follows. The terminal obtains a light sensitivity value used for photographing. The terminal determines a target number corresponding to the light sensitivity value, where the target number is larger than or equal to two. The terminal determines the target number as the preset number.

For example, in different environments of low light, the terminal can use different light sensitivity values to take photos. Generally, the larger a light sensitivity value, the higher image noise of a picture taken by the terminal, and the lower the quality of the picture.

Therefore, for different light sensitivity values used for photographing, the terminal can use different numbers of pictures as input pictures when performing the multi-frame denoising processing. For example, the terminal can set a correspondence table in advance. The correspondence table contains multiple light sensitivity value ranges and numbers each corresponding to one of the light sensitivity value ranges. In one example, the larger light sensitivity values in one light sensitivity value range, the larger a number corresponding to the one light sensitivity value range. For example, a number corresponding to a light sensitivity value range [200, 800) is four, a number corresponding to a light sensitivity value range [800, 1000] is five, a number corresponding to a light sensitivity value range in which a lower limit is larger than 1000 is six, and so on.

Based on this, when it needs to use the multi-frame denoising processing, the terminal can first obtain the light sensitivity value used for photographing. The terminal then queries the correspondence table to determine the target number corresponding to the light sensitivity value, and determines the target number as the preset number. The preset number determined by the terminal represents the number of target pictures needed to be obtained when performing the multi-frame denoising processing.

In an example, the terminal can further perform the following. The terminal sets the correspondence table, where the correspondence table records multiple light sensitivity value ranges and numbers each corresponding to one of the light sensitivity value ranges, and the larger light sensitivity values in one of the light sensitivity value ranges, the larger a number corresponding to the one of the light sensitivity value ranges.

The terminal can determine the target number corresponding to the light sensitivity value as follows. The terminal queries the correspondence table and determines, according to the correspondence table, a light sensitivity value range containing the light sensitivity value. The terminal determines a number corresponding to the light sensitivity value range containing the light sensitivity value as the target number.

For example, when the light sensitivity value used for photographing is 700, the light sensitivity value falls within a range of [200, 800), and a number corresponding to the range is four. The terminal can then determine that the target number is four. That is, the terminal needs to obtain four pictures for the multi-frame denoising processing. When the light sensitivity value used for photographing is 800, the light sensitivity value falls within a range of [800, 1000], and a number corresponding to the range is five. The terminal can then determine that the target number is five. That is, the terminal needs to obtain five pictures for the multi-frame denoising processing.

It can be understood that for different light sensitivity values, different numbers of target pictures are obtained for performing the multi-frame denoising processing, and thus effect of image denoising can be improved.

In some examples, the following condition may occur, i.e., the number of the target pictures determined by the terminal is smaller than the preset number. For example, when the light sensitivity value used for photographing is 800, the terminal needs to obtain five pictures for performing the multi-frame denoising processing. However, the terminal only determines four target pictures. Under this condition, the terminal can only use four pictures to perform the multi-frame denoising processing. That is, under the condition that the number of the target pictures is smaller than the present number, if the number of the target pictures is not smaller than two, the terminal can still perform the multi-frame denoising processing.

In an example, the method of the implementation of the present disclosure may further includes the following. Based on that the at least one target picture is embodied as one target picture, the terminal can determine the one target picture as the output picture.

For example, under the condition that the light sensitivity value used for photographing is 800, the terminal needs to obtain five target pictures for performing the multi-frame denoising processing. However, the terminal only determines one target picture. For example, among the eight pictures taken by the terminal, the eye part in only one picture is in the eyes-open state. Under this condition, since there is only one target picture, the terminal can directly determine the target picture as the output picture.

Certainly, in another example, if the terminal determines only one target picture an eye part in which is in the eyes-open state or no target picture is determined by the terminal, it can be determined that a picture in which an eye part is in an eyes-closed state needs to be taken. At this point, the terminal can select multiple pictures each containing an eye part in the eyes-closed state for performing multi-frame synthesis, and output a picture containing an eye part in the eyes-closed state.

Figure 3:
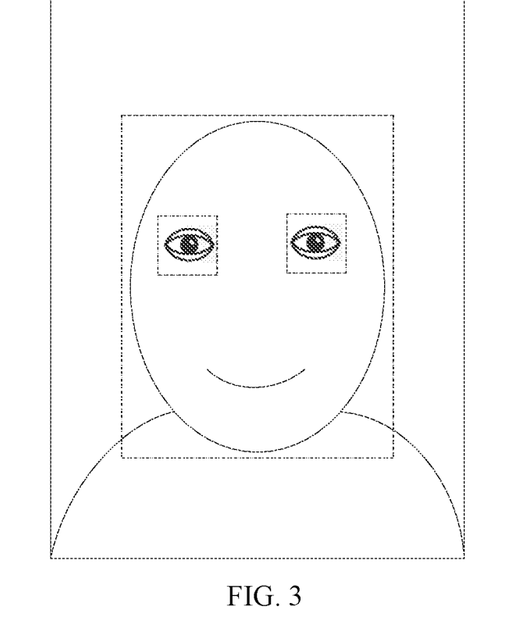
FIGS. 3-5 are schematic diagrams illustrating scenarios to which a method for picture processing is applied according to an implementation of the present disclosure.
Figure 4:
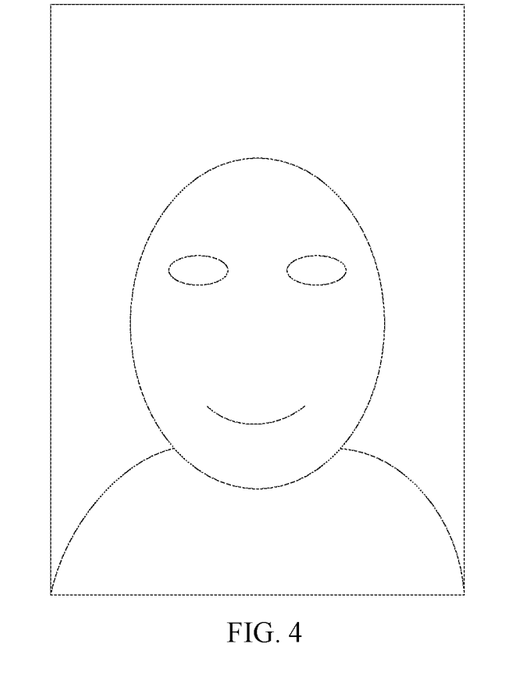
Figure 5:
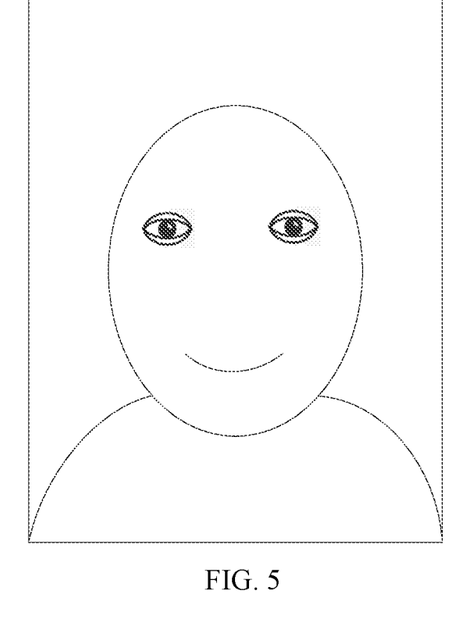

FIGS. 3-5 are schematic views illustrating scenarios to which a method for picture processing is applied according to an implementation of the present disclosure.

For example, when the user needs to take a half-length picture of a friend in low light, the multi-frame denoising function of the terminal is activated.

For example, after a shutter button is pressed, the terminal can continuously take eight pictures of the user's friend. In chronological order of photographing, the pictures A, B, C, D, E, F, G, and H are taken sequentially. In addition, the terminal determines that the light sensitivity value used for photographing is 600, and according to the light sensitivity value, the terminal determines that four target pictures need to be obtained for the multi-frame denoising processing.

First, the terminal can obtain the eight pictures A, B, C, D, E, F, G, and H. Then, the terminal selects all the eight pictures. The terminal can then determine, with face recognition technology, a facial region in each of the eight pictures, then determines an eye part in each of the eight pictures, and then extracts feature information of the eye part in each of the eight pictures. As illustrated in FIG. 3, one of the eight pictures is taken as an example.

Thereafter, the terminal can detect, in chronological order of photographing, whether the feature information of the eye part in each of the eight pictures indicates that the eye part in each of the eight pictures is in the eyes-open state. What needs to be illustrated is that the eye part being in the eyes-closed state means that eyes are closed, while the eye part being in the eyes-open state means that the eyes are opened.

If the feature information of the eye part in one picture indicates that the eye part in the one picture is in the eyes-open state, the terminal can determine the one picture as a target picture. If the feature information of the eye part in one picture indicates that the eye part in the one picture is in the eyes-closed state, the terminal can determine that the one picture is not a target picture.

For example, for the picture A, according to the feature information of the eye part in the picture A, the terminal detects that the feature information of the eye part in the picture A indicates that the eye part in the picture A is in the eyes-open state, and then the terminal determines the picture A as a target picture, as illustrated in FIG. 5.

For the picture C, according to the feature information of the eye part in the picture C, the terminal detects that the feature information of the eye part in the picture C indicates that the eye part in the picture C is in the eyes-closed state, and then the terminal discards the picture C, that is, determines that the picture C is not a target picture, as illustrated in FIG. 4.

During detecting the pictures in chronological order of photographing, the terminal can calculate the number of the target pictures determined by the terminal. If the number of the target pictures determined by the terminal reaches four, the terminal can stop searching for a target picture. If the number of the target pictures determined by the terminal does not reach four, the terminal can further search for a target picture.

For example, during searching for a target picture, the terminal determines the pictures A and B as target pictures, determines that the pictures C and D are not target pictures, and determines the pictures E and F as target pictures. After determining the picture F as the target picture, the terminal detects that the number of the target pictures reaches four, and then the terminal can stop searching for a target picture, that is, the terminal does not detect whether the pictures G and H are target pictures.

After determining the pictures A, B, E, and F as target pictures, the terminal can perform the multi-frame denoising processing on the four pictures to obtain an output picture.

Figure 6:
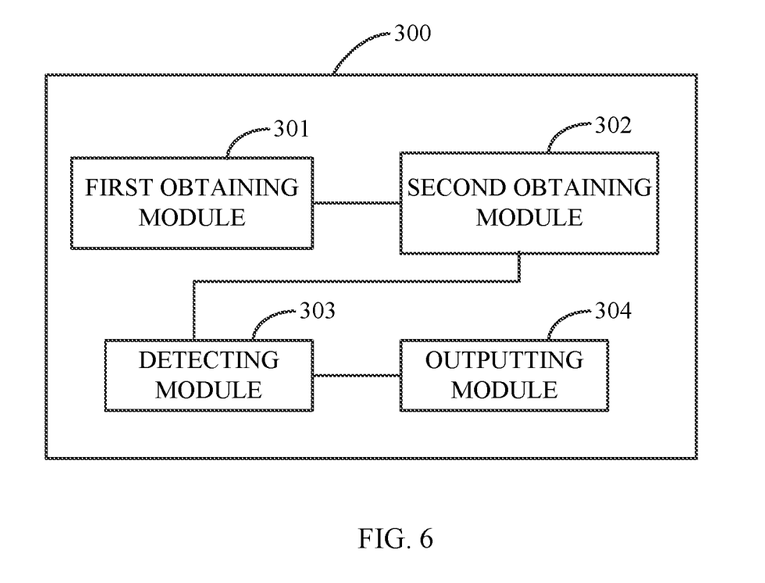
FIG. 6 is a schematic structural diagram illustrating a device for picture processing according to an implementation of the present disclosure.

FIG. 6 is a schematic structural diagram illustrating a device for picture processing according to an implementation of the present disclosure. The device 300 for picture processing includes a first obtaining module 301, a second obtaining module 302, a detecting module 303, and an outputting module 304.

The first obtaining module 301 is configured to obtain multiple pictures through photographing, where each of the multiple pictures contains facial information.

For example, under a condition that a terminal activates a multi-frame denoising function, when a user uses the terminal to take a picture of the user's friend, the terminal may take multiple pictures continuously, for example, eight pictures. Thereafter, the first obtaining module 301 of the terminal can obtain the eight pictures, where each of the eight pictures contains facial information of the user's friend.

The second obtaining module 302 is configured to select at least two pictures from the multiple pictures, and obtain, according to facial information of each of the at least two pictures, feature information of a preset facial part in each of the at least two pictures.

The detecting module 303 is configured to determine at least one target picture in response to the feature information of the preset facial part in one of the at least two pictures indicating that the preset facial part is in a preset feature state, where the one of the at least two pictures is determined as one of the at least one target picture.

For example, after the first obtaining module 301 obtains the eight pictures each containing facial information, the second obtaining module 302 can select at least two pictures from the eight pictures. For example, the second obtaining module 302 can first select six pictures from the eight pictures. For example, the six pictures are respectively the pictures A, B, C, D, E, and F.

The second obtaining module 302 can then obtain, according to facial information of each of the pictures A, B, C, D, E, and F, feature information of a preset facial part in each of the pictures A, B, C, D, E, and F. For example, according to the facial information of the picture A, the second obtaining module 302 can obtain the feature information of the preset facial part in the picture A.

What needs to be illustrated is that in an example, the preset facial part may be easily changed between different states, for example, may be an eye part or a mouth part. For example, during photographing, a person to be photographed may blink, such that eye parts in some pictures are in an eyes-closed state, while eye parts in other pictures are in an eyes-open state.

Thereafter, the detecting module 303 can detect, according to the obtained feature information of the preset facial part in each of the pictures, whether the feature information of the preset facial part in each of the pictures indicates that the preset facial part in each of the pictures is in the preset feature state.

If the feature information of the preset facial part in one picture indicates that the preset facial part in the one picture is not in the preset feature state, the terminal can determine that the one picture is not a target picture. For example, when the detecting module 303 detects that the feature information of the preset facial part in the picture C indicates that the preset facial part in the picture C is not in the preset feature state, the terminal can determine that the picture C is not a target picture. That is, the terminal does not use the picture C as an input picture for multi-frame denoising processing.

If the feature information of the preset facial part in one picture indicates that the preset facial part in the one picture is in the preset feature state, the detecting module 303 can determine the one picture as a target picture. For example, when the detecting module 303 detects that the feature information of the preset facial part in the picture A indicates that the preset facial part in the picture A is in the preset feature state, the detecting module 303 can determine the picture A as a target picture. That is, the detecting module 303 uses the picture A as an input picture for multi-frame denoising processing.

The outputting module 304 is configured to perform, based on that the at least one target picture is embodied as a plurality of target pictures, the multi-frame denoising processing on the target pictures to obtain an output picture.

For example, among the pictures A, B, C, D, E, and F, the pictures A, B, D, and E are determined as the target pictures by the detecting module 303. The outputting module 304 can perform the multi-frame denoising processing on the pictures A, B, D, and E, and obtain a picture via multi-frame synthesis, that is, the output picture.

In an example, the second obtaining module 302 can be configured to obtain, according to facial information of each of the at least two pictures, feature information of an eye part in each of the at least two pictures.

Based on this, the detecting module 303 can be configured to determine one of the at least two pictures as a target picture when the feature information of the eye part in the one of the at least two pictures is in the eyes-open state.

For example, after selecting the at least two pictures from the multiple pictures, the second obtaining module 302 can obtain the facial information of each of the at least two pictures, and obtain the feature information of the eye part in each of the at least two pictures. Thereafter, the detecting module 303 can detect whether the feature information of the eye part in each of the at least two pictures indicates that the eye part in each of the at least two pictures is in the eyes-open state.

If the feature information of the eye part in one of the at least two pictures is in the eyes-open state, the detecting module 303 can determine the one of the at least two pictures as a target picture.

If the feature information of the eye part in one of the at least two pictures is not in the eyes-open state, the detecting module 303 can determine that the one of the at least two pictures is not a target picture. That is, the terminal does not use the one of the at least two pictures as an input picture for multi-frame denoising processing.

In an example, the detecting module 303 is configured to detect, in chronological order of taking the at least two pictures, whether the feature information of the eye part in each of the at least two pictures indicates that the eye part in each of the at least two pictures is in an eyes-open state, and determine the at least two pictures as target pictures when the feature information of the eye part in each of the at least two pictures indicates that the eye part in each of the at least two pictures is in the eyes-open state.

For example, after the second obtaining module 302 obtains the feature information of the eye part in each of the at least two pictures, the detecting module 303 can detect, in chronological order of taking the at least two pictures, whether the feature information of the eye part in each of the at least two pictures indicates that the eye part in each of the at least two parts is in the eyes-open state.

For example, in chronological order of taking the pictures A, B, C, D, E, F, G, and H, the detecting module 303 can first detect whether the feature information of the eye part in the picture A indicates that the eye part in the picture A is in the eyes-open state.

If the feature information of the eye part in the picture A indicates that the eye part in the picture A is in the eyes-open state, the detecting module 303 can determine the picture A as a target picture.

If the feature information of the eye part in the picture A indicates that the eye part in the picture A is not in the eyes-open state, the detecting module 303 can determine that the picture A is not a target picture. That is, the terminal does not use the picture A as an input picture for the multi-frame denoising processing.

Similarly, the terminal can detect the pictures B, C, D, E, F, G, and H in sequence.

Figure 7:
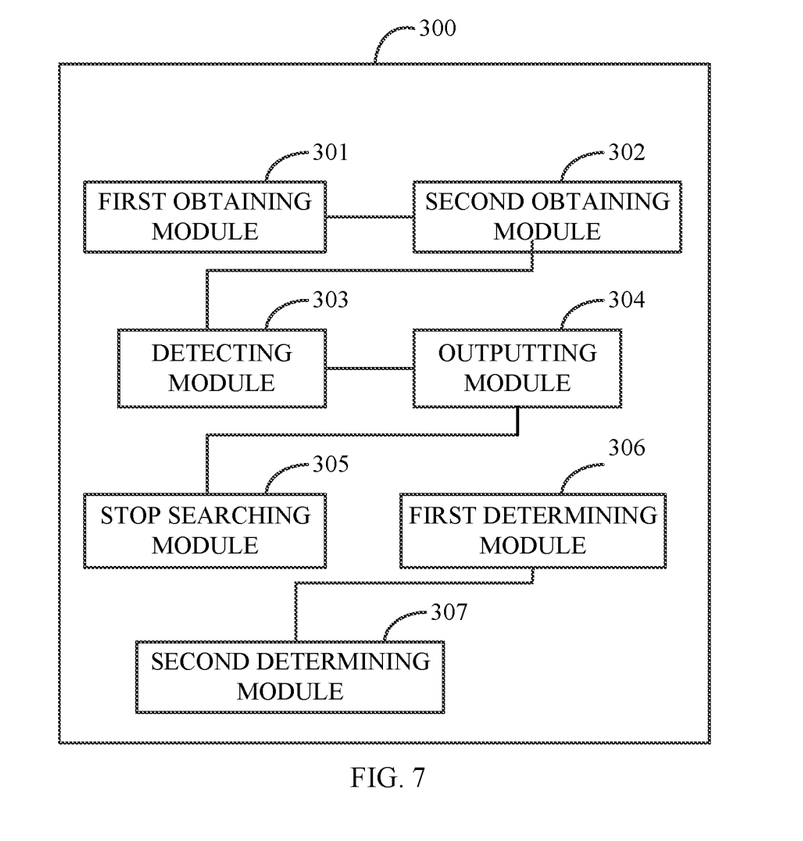
FIG. 7 is a schematic structural diagram illustrating a device for picture processing according to another implementation of the present disclosure.

FIG. 7 is a schematic structural diagram illustrating a device for picture processing according to an implementation of the present disclosure. In an example, the device 300 for picture processing may further include a stop searching module 305, a first determining module 306, and a second determining module 307.

The stop searching module 305 is configured to stop searching for a target picture when the number of the target pictures determined reaches a preset number.

For example, during a process of sequentially detecting whether the eye parts in the pictures are in the eyes-open state, the stop searching module 305 can further detect whether the number of the target pictures determined reaches the preset number.

When the number of the target pictures determined by the terminal reaches the preset number, the stop searching module 305 can stop searching for a target picture.

When the number of the target pictures determined by the terminal does not reach the preset number, the terminal can further search for a target picture.

For example, the preset number is four. That is, during the process of sequentially detecting whether the eye parts in the pictures A, B, C, D, E, F, G, and H are in the eyes-open state, if the stop searching module 305 detects that the number of the target pictures determined by the terminal reaches four, the stop searching module 305 can stop searching for a target picture.

The first determining module 306 is configured to obtain a light sensitivity value used for photographing, determine a target number corresponding to the light sensitivity value, and determine the target number as the preset number, where the target number is larger than or equal to two.

For example, in different environments of low light, the terminal can use different light sensitivity values to take photos. Generally, the larger a light sensitivity value, the higher image noise of a picture taken by the terminal, and the lower the quality of the picture.

Therefore, for different light sensitivity values used for photographing, the terminal can use different numbers of pictures as input pictures when performing the multi-frame denoising processing. For example, the terminal can set a correspondence table in advance. The correspondence table contains multiple light sensitivity value ranges and numbers each corresponding to one of the light sensitivity value ranges. In one example, the larger light sensitivity values in one light sensitivity value range, the larger a number corresponding to the one light sensitivity value range. For example, a number corresponding to a light sensitivity value range [200, 800) is four, a number corresponding to a light sensitivity value range [800, 1000] is five, a number corresponding to a light sensitivity value range in which a lower limit is larger than 1000 is six, and so on.

Based on this, when it needs to use the multi-frame denoising processing, the first determining module 306 can first obtain the light sensitivity value used for photographing. The first determining module 306 then queries the correspondence table to determine the target number corresponding to the light sensitivity value, and determines the target number as the preset number. The preset number determined by the terminal represents the number of target pictures needed to be obtained when performing the multi-frame denoising processing.

For example, when the light sensitivity value used for photographing is 700, the terminal needs to obtain four pictures for performing the multi-frame denoising processing. When the light sensitivity value used for photographing is 800, the terminal needs to obtain five pictures for performing the multi-frame denoising processing.

In an example, the first determining module 306 is further configured to set the correspondence table, where the correspondence table records multiple light sensitivity value ranges and numbers each corresponding to one of the light sensitivity value ranges, and the larger light sensitivity values in one light sensitivity value range, the larger a number corresponding to the one light sensitivity value range.

The first determining module 306 configured to determine the target number corresponding to the light sensitivity value is configured to query the correspondence table, determine, according to the correspondence table, a light sensitivity value range containing the light sensitivity value, and determine a number corresponding to the light sensitivity value range containing the light sensitivity value as the target number.

The second determining module 307 is configured to determine, based on that the at least one target picture is embodied as one target picture, the one target picture as the output picture.

For example, under the condition that the light sensitivity value used for photographing is 800, the terminal needs to obtain five target pictures for performing the multi-frame denoising processing. However, the detecting module 303 only determines one target picture. For example, among the eight pictures taken by the terminal, the eye part in only one picture is in the eyes-open state. Under this condition, since there is only one target picture, the second determining module 307 can directly determine the target picture as the output picture.

Implementations of the present disclosure further provides a computer-readable storage medium. The computer-readable storage medium stores computer programs. The computer programs are loaded and executed by a processor to implement the method for picture processing provided in the implementations of the present disclosure.

Implementations of the present disclosure further provides an electronic device. The electronic device includes a memory, a processor, and computer programs stored in the memory and capable of being run in the processor. The processor is configured to execute the computer programs to implement the method for picture processing according to an implementation of the present disclosure.

Figure 8:
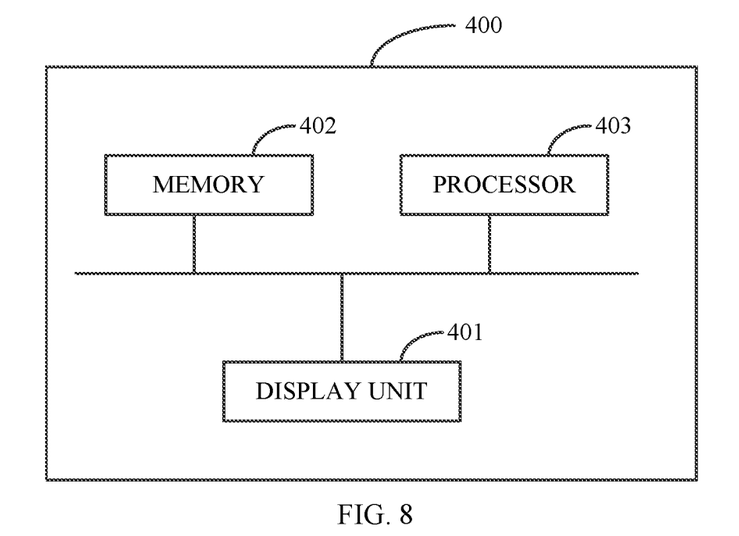
FIG. 8 is a schematic structural diagram illustrating a mobile terminal according to an implementation of the present disclosure.

For example, the electronic device may be a mobile terminal such as a tablet computer, a mobile phone and the like. FIG. 8 is a schematic structural diagram illustrating a mobile terminal according to an implementation of the present disclosure.

A mobile terminal 400 may include a display unit 401, a memory 402, a processor 403 and the like. Those skilled in the art can understand that a structure of the mobile terminal illustrated in FIG. 8 does not constitute any limitation on the mobile terminal. The mobile terminal may include more or fewer components than illustrated, a combination of some components, or different component arrangements.

The display unit 401 may be configured to display images and texts, for example, may be a display screen and the like.

The memory 402 is configured to store application programs and data. The application programs stored in the memory 402 contain executable codes. The application programs can form various functional modules. The processor 403 runs the application programs stored in the memory 402 to perform various functional application and data processing.

The processor 403 is a control center of the mobile terminal. The processor 403 is coupled to various parts of the whole mobile terminal through various interfaces and lines, runs or executes the application programs stored in the memory 402 and invokes data stored in the memory 402 to perform various functions of the mobile terminal and process data, thereby monitoring the mobile terminal as a whole.

In an example, the processor 403 of the mobile terminal can load, according to following instructions, executable codes corresponding to one or more application programs to the memory 402. The processor 403 runs the application programs stored in the memory 402 to realize the following. Multiple pictures are obtained through photographing, where each of the multiple pictures contains facial information. At least two pictures are selected from the multiple pictures, and according to the facial information of each of the at least two pictures, feature information of a preset facial part in each of the at least two pictures is obtained. At least one target picture is determined in response to the feature information of the preset facial part in one of the at least two pictures indicating that the preset facial part is in a preset feature state, where the one of the at least two pictures is determined as one of the at least one target picture. Based on that the at least one target picture is embodied as multiple target pictures, a multi-frame denoising processing is performed on the target pictures to obtain an output picture.

Figure 9:
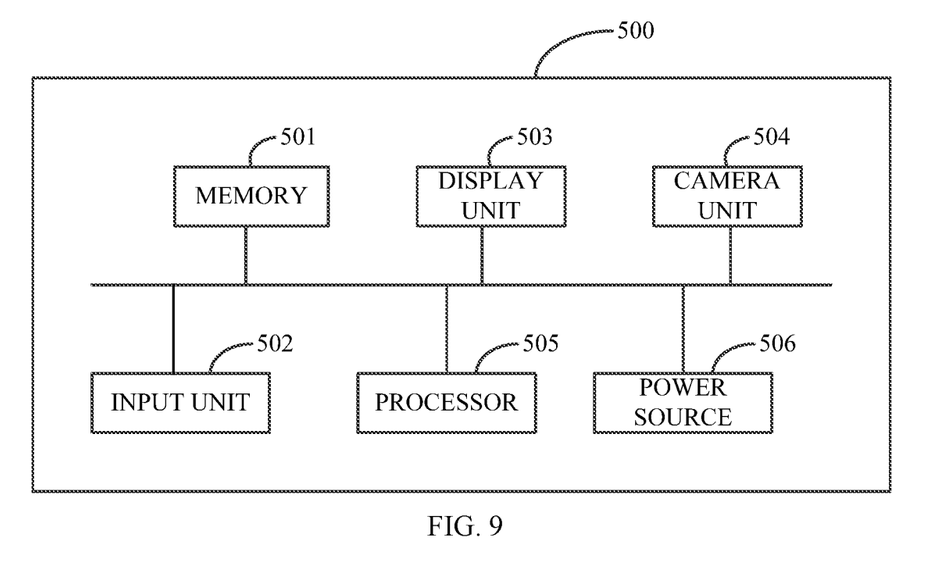
FIG. 9 is a schematic structural diagram illustrating a mobile terminal according to another implementation of the present disclosure.

FIG. 9 is a schematic structural view illustrating a mobile terminal according to another implementation of the present disclosure. A terminal 500 may include a memory 501 including one or more computer-readable storage mediums, an input unit 502, a display unit 503, a camera unit 504, a processor 505 including one or more processing cores, a power source 506, and the like. Those skilled in the art can understand that a structure of the mobile terminal illustrated in FIG. 9 does not constitute any limitation on the mobile terminal. The mobile terminal may include more or fewer components than illustrated, a combination of some components, or different component arrangements.

The memory 501 is configured to store application programs and data. The application programs stored in the memory 501 contain executable program codes. The application programs can form various functional modules. The processor 505 is configured to execute various function applications and data processing by running the application programs stored in the memory 501.

The input unit 502 may be configured to receive input digital or character information or user's characteristic information (for example, fingerprint), and generate keyboard signal input, mouse signal input, joy stick signal input, optical or trackball signal input associated with user's setting and functional control. In an example, the input unit 502 may include a touch sensitive surface and other input devices.

The display unit 503 is configured to display information input in response to the user's operation or information provided for the user or various graphical user interface of the terminal. The graphical user interface may be consisted of graphics, texts, icons, videos, or any combination thereof. The display unit 503 may include a display panel.

The camera unit 504 can be configured to take static images, videos, and the like. The camera unit 504 can use a camera to take images. A photosensitive component circuit and a control component of the camera can process an image and convert the image processed to digital signals that can be recognized by the electronic device.

The processor 505 is a control center of the mobile terminal. The processor 505 is coupled to various parts of the whole mobile terminal through various interfaces and lines, runs or executes application programs stored in the memory 501 and invokes data stored in the memory 501 to perform various functions of the mobile terminal and process data, thereby monitoring the mobile terminal as a whole.

The mobile terminal may further include a power source 506 (e.g., a battery) that supplies power to various components. For example, the power source 506 may be logically connected to the processor 505 via a power management system to realize management of charging, discharging, and power consumption through the power management system.

Although not illustrated in FIG. 9, the mobile terminal may further include a wireless fidelity (Wi-Fi) module, a Bluetooth module, and so on, and details are not repeated herein.

In an example, the processor 505 of the mobile terminal can load, according to following instructions, executable program codes corresponding to one or more application programs to the memory 501. The processor 505 runs the application programs stored in the memory 501 to realize the following. Multiple pictures are obtained through photographing, where each of the pictures contains facial information. At least two pictures are selected from the multiple pictures, and according to the facial information of each of the at least two pictures, feature information of a preset facial part in each of the at least two pictures is obtained. At least one target picture is determined in response to the feature information of the preset facial part in one of the at least two pictures indicating that the preset facial part is in a preset feature state, where the one of the at least two pictures is determined as one of the at least one target picture. Based on that the at least one target picture is embodied as multiple target pictures, a multi-frame denoising processing is performed on the target pictures to obtain an output picture.

In an example, the processor 505 configured to obtain, according to the facial information of each of the at least two pictures, the feature information of the preset facial part in each of the at least two pictures is configured to obtain, according to the facial information of each of the at least two pictures, feature information of an eye part in each of the at least two pictures.

Based on this, the processor 505 configured to determine the at least two pictures as target pictures based on that the feature information of the preset facial part in each of the at least two pictures indicates that the preset facial part in each of the at least two pictures is in the preset feature state is configured to determine the at least two pictures as the target pictures based on that the feature information of the eye part in each of the at least two pictures indicates that the eye part in each of the at least two pictures is in an eyes-open state.

In an example, the processor 505 configured to determine the at least two pictures as the target pictures based on that the feature information of the preset facial part in each of the at least two pictures indicates that the eye part in each of the at least two pictures is in the eyes-open state is configured to detect, in chronological order of taking the at least two pictures, whether the feature information of the eye part in each of the at least two pictures indicates that the eye part in each of the at least two pictures is in the eyes-open state, and determine one of the at least two pictures as a target picture based on that the feature information of the eye part in the one of the at least two pictures indicates that the eye part in the one of the at least two pictures is in the eyes-open state.

In an example, the processor 505 is further configured to stop searching for a target picture based on that the number of the target pictures determined reaches a preset number.

In an example, the processor 505 is further configured to obtain a light sensitivity value used for photographing, determine a target number corresponding to the light sensitivity value, and determine the target number as the preset number, where the target number is larger than or equal to two.

In an example, the processor 505 is further configured to determine, based on that the at least one target picture is embodied as one target picture, the one target picture as the output picture.

In an example, the processor 505 is further configured to set a correspondence table, where the correspondence table contains multiple light sensitivity value ranges and numbers each corresponding to one of the multiple light sensitivity value ranges, and where the larger light sensitivity values in one light sensitivity value range, the larger a number corresponding to the one light sensitivity value range.

The processor 505 configured to determine the target number corresponding to the light sensitivity value is configured to query the correspondence table and determine a light sensitivity value range containing the light sensitivity value according to the correspondence table, and determine a number corresponding to the light sensitivity value range containing the light sensitivity value as the target number.

For the above implementations, each implementation has its own emphasis. For some parts not described in detail in some implementations, reference can be made to the method for picture processing described in detail, and details are not repeated herein.

The device for picture processing provided in the implementation of the present disclosure and the methods for picture processing described above have the same conception. The device for picture processing can run any of the methods for picture processing provided in the implementations, and for details reference can be made to the methods for picture processing provided in the implementations, and details are not repeated herein.

What needs to be illustrated is that for the method for picture processing provided in the implementation of the present disclosure, those ordinarily skilled in the art shall understand that all or a part of operations of the method for picture processing provided in the implementations of the present disclosure may be accomplished by means of a computer program to instruct associated hardware. The computer program may be stored in a computer-readable storage medium such as a memory and executed by at least one processor. When the computer program is executed by the at least one processor, the operations in the method for picture processing provided in the implementations of the present disclosure can be realized. The storage medium may be a disc or a CD, a read only memory (ROM), a random access memory (RAM), and so on.

For the device for picture processing provided in the implementation of the present disclosure, various functional modules can be integrated in a processing chip, or may separately and physically exist, or two or more modules may be integrated in one module. The modules integrated can be implemented in hardware form or in software functional module form. The modules integrated may be stored in a computer-readable storage medium if implemented in the software functional module form and sold or used as an independent product. The storage medium for example may be a ROM, a disc or CD, or the like.

The above illustrates the method and device for picture processing, the computer-readable storage medium, and the electronic device provided in the implementations of the present disclosure in detail. The specification employs specific examples to illustrate the principle and implementation manners of the present disclosure. The illustration of the above implementations is just used to help in understanding of the method and core concept of the present disclosure. For a person ordinarily skilled in the art, according to the concept of the present disclosure, changes may be made on the specific implementations and application range. In conclusion, the content of the specification shall not be understood to limit the present disclosure.

What is claimed is:

1. A method for picture processing, comprising:
    obtaining a plurality of pictures through photographing, each of the plurality of pictures containing facial information;
    selecting at least two pictures from the plurality of pictures, and obtaining, according to the facial information of each of the at least two pictures, feature information of a preset facial part in each of the at least two pictures;
    determining a plurality of target pictures, wherein in response to the feature information of the preset facial part in one of the at least two pictures indicating that the preset facial part is in a preset feature state, the one of the at least two pictures is determined as one target picture;
    stopping searching for another target picture based on that the number of the plurality of target pictures determined reaches a preset number, the preset number being determined by:
        obtaining a light sensitivity value used for the photographing; and
        determining the preset number according to the light sensitive value used for the photographing and a correspondence table, the correspondence table containing a plurality of light sensitivity value ranges and numbers each corresponding to one of the plurality of light sensitivity value ranges, the larger light sensitivity values in one of the light sensitivity value ranges, the larger a number corresponding to the one of the light sensitivity value range, and a number corresponding to one light sensitivity value range containing the light sensitive value used for the photographing being determined as the preset number; and
    performing a multi-frame denoising processing on the plurality of target pictures to obtain an output picture.

2. The method of claim 1, wherein:
    the preset facial part in each of the at least two pictures is an eye part in each of the at least two pictures; and
    the preset feature state is an eyes-open state.

3. The method of claim 1, wherein determining the plurality of target pictures comprises:
    detecting, in chronological order of taking the at least two pictures, whether the feature information of the preset facial part in each of the at least two pictures indicates that the preset facial part is in the preset feature state; and
    determining one of the at least two pictures as one of the at least one target picture in response to the preset facial part in the one of the at least two pictures being in the preset feature state.

4. The method of claim 1, further comprising:
    on condition that only one target picture is determined, determining the only one target picture as the output picture.

5. An electronic device comprising:
    a processor; and
    a memory configured to store one or more programs;
    wherein the one or more programs, when executed, are operable by the processor to:
        obtain a plurality of pictures through photographing, each of the plurality of pictures containing facial information;
        select at least two pictures from the plurality of pictures, and obtain, according to the facial information of each of the at least two pictures, feature information of a preset facial part in each of the at least two pictures;
        determine a plurality of target pictures, wherein in response to the feature information of the preset facial part in one of the at least two pictures indicating that the preset facial part is in a preset feature state, the one of the at least one pictures is determined as one target picture;
        stop searching for another target picture based on that a number of the plurality of target pictures determined reaches a preset number, wherein the one or more programs are operable by the processor to determine the preset number
            obtaining a light sensitivity value used for the photographing; and
            determining the preset number according to the light sensitive value used for the photographing and a correspondence table, the correspondence table containing a plurality of light sensitivity value ranges and numbers each corresponding to one of the plurality of light sensitivity value ranges, the larger light sensitivity values in one of the light sensitivity value ranges, the larger a number corresponding to the one of the light sensitivity value range, and a number corresponding to one light sensitivity value range containing the light sensitive value used for the photographing being determined as the preset number; and
        perform a multi-frame denoising processing on the plurality of target pictures to obtain an output picture.

6. The electronic device of claim 5, wherein:
    the preset facial part in each of the at least two pictures is an eye part in each of the at least two pictures; and
    the preset feature state is an eyes-open state.

7. The electronic device of claim 5, wherein the one or more programs operable by the processor to determine the plurality of target pictures are operable by the one or more programs to:
    detect, in chronological order of taking the at least two pictures, whether the feature information of the preset facial part in each of the at least two pictures indicates that the preset facial part is in the preset feature state; and determine the at least two pictures as the target pictures in response to the preset facial part in each of the at least two pictures being in the preset feature state.

8. A non-transitory computer readable storage medium configured to store one or more programs comprising instructions which, when executed, are operable by a processor to:

obtain a plurality of pictures through photographing, each of the plurality of pictures containing facial information;

select at least two pictures from the plurality of pictures, and obtain, according to the facial information of each of the at least two pictures, feature information of a preset facial part in each of the at least two pictures;

determine a plurality of target pictures, wherein in response to the feature information of the preset facial part in one of the at least two pictures indicating that the preset facial part is in a preset feature state, the one of the at least two pictures is determined as one target picture;

stop searching for another target picture based on that a number of the plurality of target pictures determined reaches a preset number, wherein the one or more programs are operable by the processor to determine the preset number by:

obtaining a light sensitivity value used for the photographing; and determining the preset number according to the light sensitive value used for the photographing and a correspondence table, the correspondence table containing a plurality of light sensitivity value ranges and numbers each corresponding to one of the plurality of light sensitivity value ranges, the larger light sensitivity values in one of the light sensitivity value ranges, the larger a number corresponding to the one of the light sensitivity value range, and a number corresponding to one light sensitivity value range containing the light sensitive value used for the photographing being determined as the preset number; and perform a multi-frame denoising processing on the plurality of target pictures to obtain an output picture.

9. The non-transitory computer readable storage medium of claim 8, wherein:

the preset facial part in each of the at least two pictures is an eye part in each of the at least two pictures; and the preset feature state is an eyes-open state.

10. The non-transitory computer readable storage medium of claim 8, wherein the one or more programs operable by the processor to determine the plurality of target pictures are operable by the one or more programs to:

detect, in chronological order of taking the at least two pictures, whether the feature information of the preset facial part in each of the at least two pictures indicates that the preset facial part is in the preset feature state; and determine one of the at least two pictures as one of the at least one target picture in response to the preset facial part in the one of the at least two pictures being in the preset feature state.

11. The non-transitory computer readable storage medium of claim 8, wherein the one or more programs are further operable by the one or more programs to:

determine, on condition that only one target picture is determined, the only one target picture as the output picture.

* * * * *